UNITED STATES PATENT OFFICE.

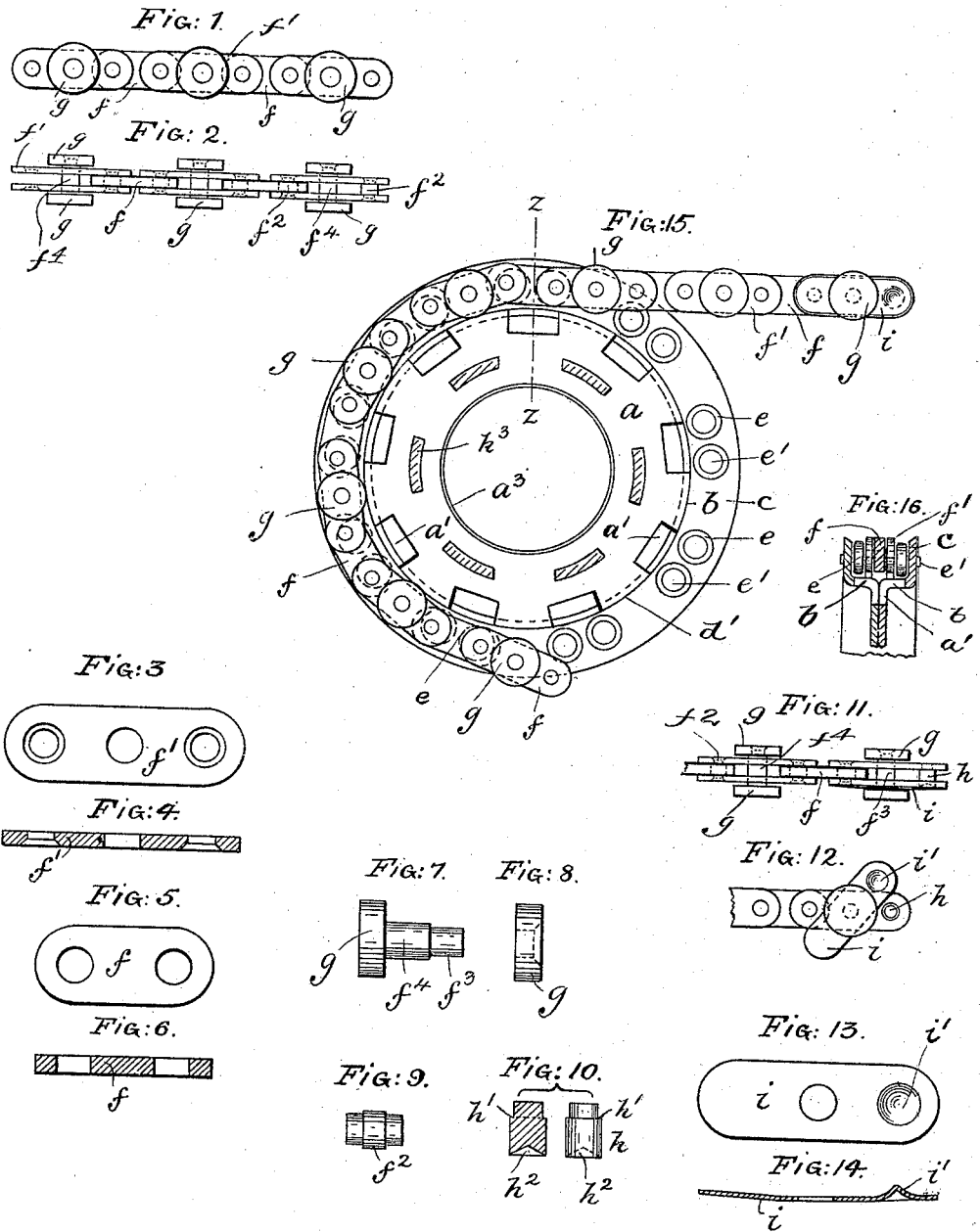

THOMAS HEWETT, OF LONDON, ENGLAND, ASSIGNOR OF ONE-HALF TO THOMAS KERRISON BELLIS, OF SAME PLACE.

CHAIN-GEARING.

SPECIFICATION forming part of Letters Patent No. 639,043, dated December 12, 1899.

Application filed February 10, 1898. Serial No. 669,820. (No model.)

*To all whom it may concern:*

Be it known that I, THOMAS HEWETT, mechanical engineer, a subject of the Queen of Great Britain, residing at 6 Jeffrey's Square, St. Mary Axe, in the city of London, England, have invented certain new and useful Improvements in or in Connection with Chain-Gearing, of which the following is a specification.

This invention has for its object to provide a new and improved drive-chain designed for driving bicycles and other velocipedes and for a variety of analogous purposes.

To accomplish this object, my invention consists in the features of construction and in the combination of parts hereinafter described and claimed, reference being made to the accompanying drawings, in which—

Figure 1 is a side elevation of a portion of my improved drive-chain. Fig. 2 is a top plan view of the same. Figs. 3 to 14, inclusive, are detail views of parts of the chain hereinafter fully described. Fig. 15 is a sectional elevation of a portion of my improved drive-chain applied to a chain-wheel; and Fig. 16 is a detail sectional view taken on the line $z\,z$, Fig. 15.

In order to enable those skilled in the art to make and use my invention, I will now describe the same in detail, referring to the drawings, wherein—

The letter $a$ indicates the chain-wheel, which is provided with shoulders $b$ and radial extensions $c$ to form an annular channel $d$, in which the drive-chain lies. The radial flanges $c$ carry antifriction-rolls $e$ on rivets $e'$. Below the rolls $e$ are formed clear spaces $a'$, which serve as mud-escape ports in the channel-bed $d'$.

I prefer to arrange the rollers $e$ on the inside of the wheel-flanges $c$ in pairs, each pair on one side opposite a pair on the other side, and I arrange the chain to coöperate with the wheel, (either to drive the wheel or to be driven thereby, as the case may be,) with a series of central links $f$ at intervals so arranged that they shall in operation when in the trough of the wheel lie between the flange-rollers $e$, with the ends of two pairs of other links $f'$ lying on either side of their ends, a rivet $f^3$ securing each three links together at their ends and forming their hinge.

The end rivet-holes of the side links $f'$ I prefer to form on their outer sides countersunk, (see Figs. 3 and 4,) and the pins $f^2$, which connect them and the central links $f$, I form of a larger diameter within each inner link, with correspondingly-enlarged holes in said inner links, the smaller outer portions to lie within correspondingly smaller holes in the side-link ends. The projecting ends of this smaller diameter I rivet up tightly into the countersunk recesses and grind off any projections not desired, or the said pins need not be riveted, as the antifriction-wheels serve to keep the two side links flush. By these means I am enabled to avoid difficulties of construction and working that have been found to arise with chains where the rollers on the chains are mounted on the same axial pins that connect the several sets of links and also to greatly improve and facilitate the construction of such chains. As a means of connecting the ends of such a chain for use in chain-gearing must be provided, I have designed the device indicated by Figs. 10, 11, 12, 13, and 14, whereby the parts of the chain-fastening are made so as to lie flush with the sides of the chain and with the annular channel of the wheel they run in. In order thus to connect together the ends or parts of a length of chain, so as to form an endless chain, the locking-stud, roller, or pin $h$ to fasten together adjacent links of a gear-chain is passed through the said links of the ends of the chain to be joined and is then locked into position by means of a leaf, plate, or spring-piece $i$, which is centered on the side face of the outer link.

The links or plates of the chain to be connected are correctly placed relatively. The short stud $h$, which may have the end first inserted of a smaller diameter, (see Fig. 10,) leaving thereby a smaller hole to be provided in the link it engages, and a small shoulder $h'$ to determine the extent of its insertion, is pushed into position, and the spring or plate $i$ is turned over the entrant hole, locking the bolt $h$ therein. A slight projection $i'$ on the inner face of the spring-plate $i$ may be sprung into a small depression $h^2$ on the outer end of the lock-stud, thereby serving to restrain any disengaging movement of the spring-plate, or the arrangement can be transposed.

The springs are centered on the antifriction-wheel axes, which pass through the link-plates of the chain. These plates $i$, that box in the locking-studs, are made of spring-steel of the same shape as the chain-links, against which they lie flush, there being no outstanding parts to catch in rollers of the chain-wheel.

The chain described carries antifriction rollers or wheels $g$, mounted on the pairs of links $f'$, independent of the studs $f^2$, which serve to connect the two links of each pair. To accomplish this, I provide pins $f^3 f^4$, (best seen in Fig. 7,) which are loosely inserted through suitable holes in the links $f'$ and carry the antifriction rollers or wheels on their ends. The part $f^3$ of smaller diameter of each pin is passed through one of the rollers or wheels and upset to retain the whole in proper position. These antifriction rollers or wheels are adapted as the chain and chain-wheel travel to engage the rollers $e$.

In a chain-gearing chain constructed as I have described, with axes of the antifriction wheels or rollers borne in bearings formed in the links independently of the studs connecting the links, it is found in practice that an advantage arises from this construction in that, except at the moment when such chain-roller teeth are actually pulling or are being pulled by the teeth of a wheel, there is no strain on their axes, whereas in gear-chains of other constructions there is nearly a constant strain on the rollers, owing to their having to serve as connections for the links of the chain.

Having now particularly described and ascertained the nature of my said invention and in what manner the same is to be performed, I declare that what I claim is—

1. A chain consisting of side links arranged in pairs, central links pivoted at their opposite ends between the ends of the side links, transverse pins journaled in openings formed in the side links midway between the ends of the latter and in alinement with the pivots of the side links, and antifriction-rollers fixed on the outer opposite ends of said pins, substantially as described.

2. In a chain consisting of side links arranged in pairs and central links pivoted at their opposite ends between the ends of the side links, the ends of the side links at the end of the chain being respectively provided with perforations of unequal size, of a joining-pin reduced at one end to fit into the smaller of said perforations and recessed at its opposite end, and a spring-plate pivoted centrally to one of said side links at the end of the chain and provided with a projection on its inner face arranged to engage the recessed end of the joining-pin, substantially as described and for the purpose specified.

In testimony whereof I have hereunto set my hand in presence of two subscribing witnesses.

THOMAS HEWETT.

Witnesses:
ALFRED GEORGE BROOKES,
ERNEST JOHN HILL.